United States Patent
Isherwood et al.

(10) Patent No.: US 8,770,659 B2
(45) Date of Patent: Jul. 8, 2014

(54) SELF-STOWING JUMPSEAT FOR AIRCRAFT

(75) Inventors: Christopher Isherwood, Colorado Springs, CO (US); Douglas E. Hoover, Colorado Springs, CO (US); Othar P. Kennedy, Colorado Springs, CO (US)

(73) Assignee: Ami Industries, Inc., Colorado Springs, CO (US)

( * ) Notice: Subject to any disclaimer, the term of this patent is extended or adjusted under 35 U.S.C. 154(b) by 359 days.

(21) Appl. No.: 13/348,207

(22) Filed: Jan. 11, 2012

(65) Prior Publication Data

US 2012/0199695 A1 Aug. 9, 2012

Related U.S. Application Data

(60) Provisional application No. 61/439,501, filed on Feb. 4, 2011.

(51) Int. Cl.
*B64D 11/06* (2006.01)
*B60N 2/30* (2006.01)

(52) U.S. Cl.
USPC .............................. 297/14; 297/333; 297/335

(58) Field of Classification Search
USPC ........ 297/14, 233, 333, 238, 335; 108/47, 48; 296/65.05, 67; 244/118.5, 122 R
See application file for complete search history.

(56) References Cited

U.S. PATENT DOCUMENTS

| | | | |
|---|---|---|---|
| 4,740,030 A | 4/1988 | Nordskog | |
| 4,911,219 A | 3/1990 | Dalrymple | |
| 4,993,666 A * | 2/1991 | Baymak et al. | 244/122 R |
| 5,516,179 A * | 5/1996 | Tidwell | 296/63 |
| 5,845,876 A | 12/1998 | Zach, Sr. | |
| 6,186,444 B1 | 2/2001 | Steel | |
| 6,460,922 B1 * | 10/2002 | Demick | 297/14 |
| 6,647,916 B2 | 11/2003 | Neese et al. | |
| 6,823,927 B2 | 11/2004 | Steel et al. | |
| 7,441,726 B2 | 10/2008 | Melberg et al. | |
| 7,665,693 B2 | 2/2010 | Bettell | |
| 2004/0189077 A1 * | 9/2004 | Moffa et al. | 297/452.39 |

* cited by examiner

*Primary Examiner* — David R Dunn
*Assistant Examiner* — Timothy J Brindley
(74) *Attorney, Agent, or Firm* — Cantor Colburn LLP

(57) ABSTRACT

A self-stowing jumpseat consists of a seat frame that is deployed by pulling the seat frame out of a pocket formed in the edge of a bulkhead. Once the seat frame has been deployed and locked in position, the seat pan is folded down to enable a user to be seated. The seat pan is spring-loaded to fold up, so that when the user vacates the seat, the seat pan automatically folds up into the closed configuration. As it does so, an interlock lever attached to the seat pan trips the seat frame locks from their locked to their unlocked positions. The seat frame has a retraction mechanism that urges the seat into the pocket. Accordingly, as soon as the seat pan interlock lever releases the seat frame locks, the retraction mechanism causes the folded seat frame to move into the stowed position within the bulkhead.

18 Claims, 11 Drawing Sheets

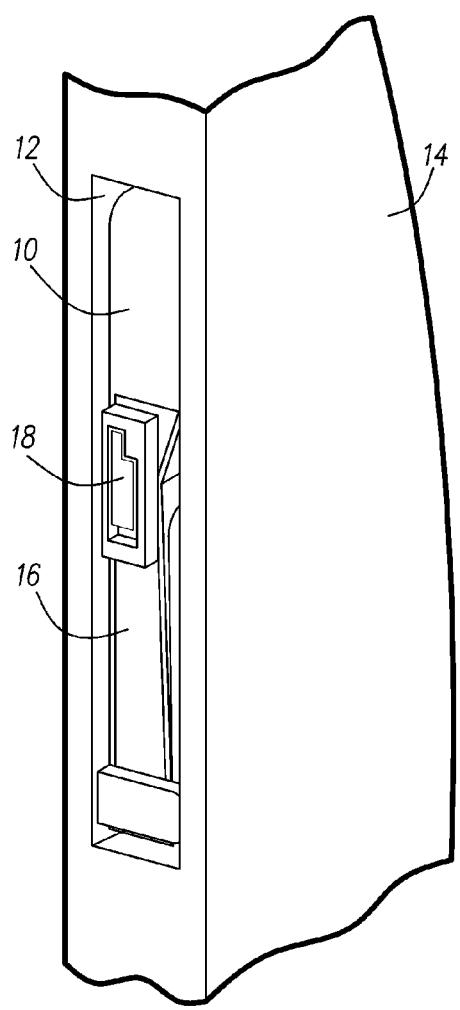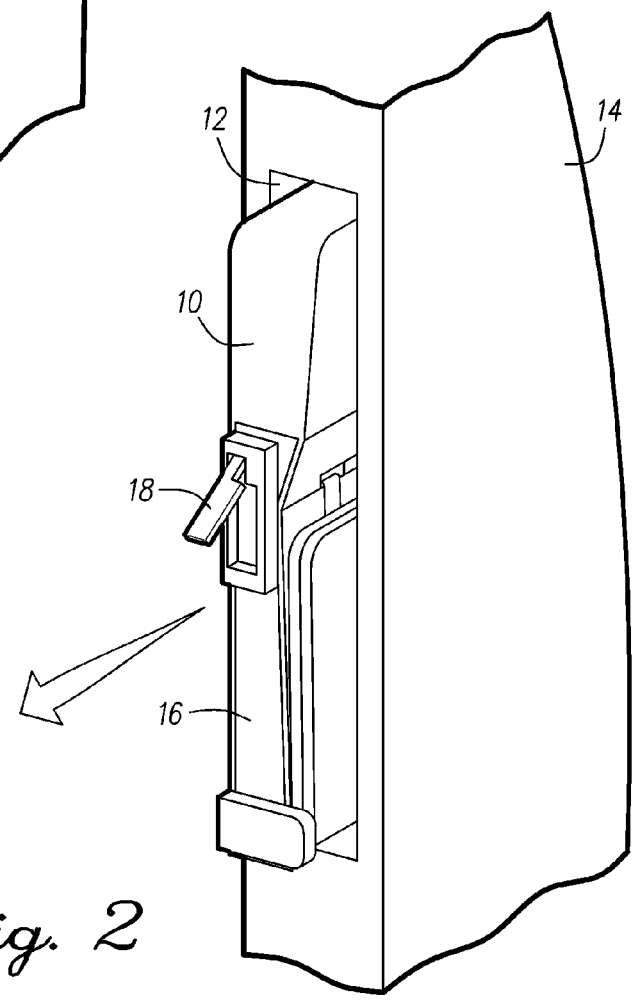

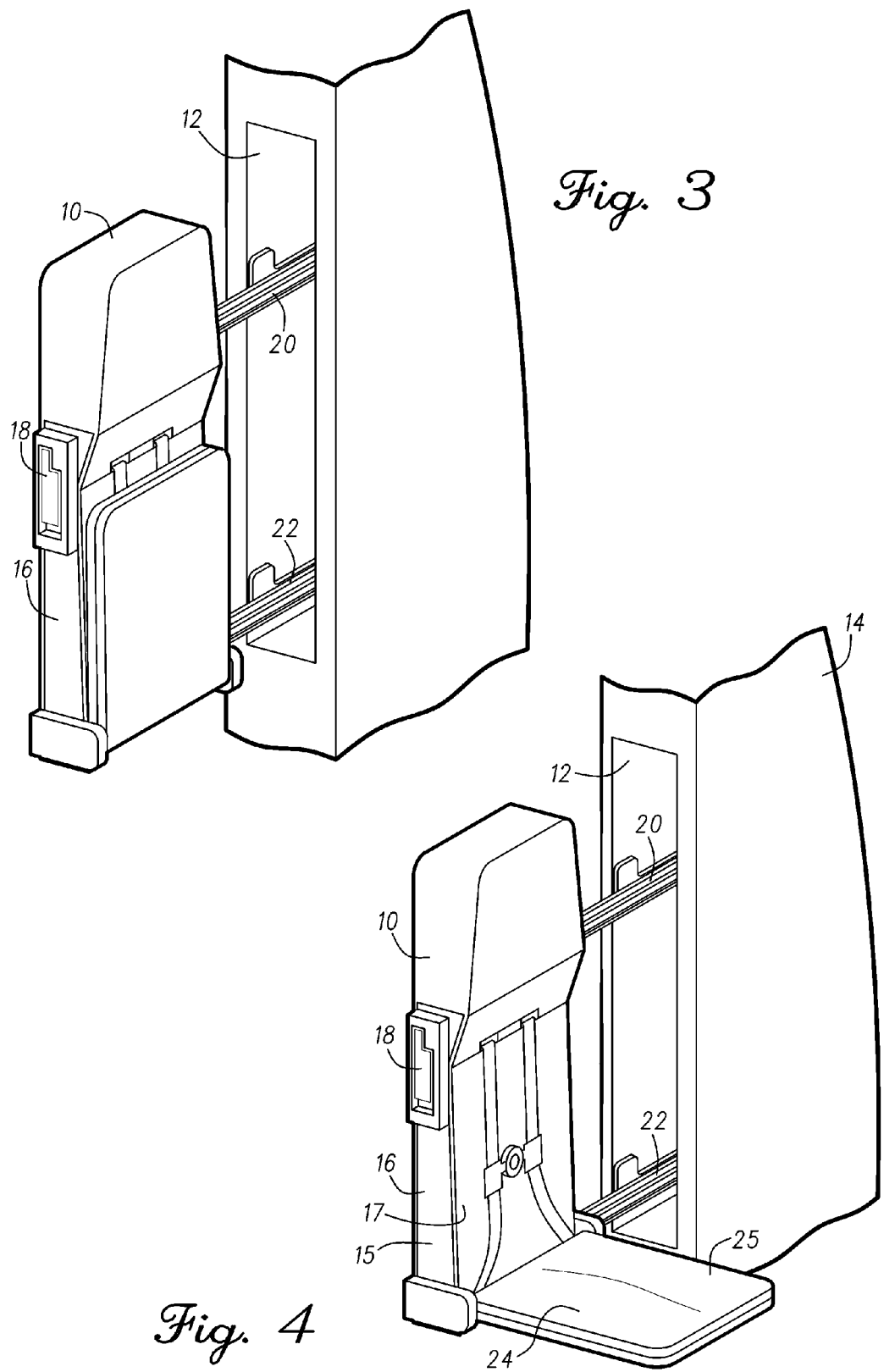

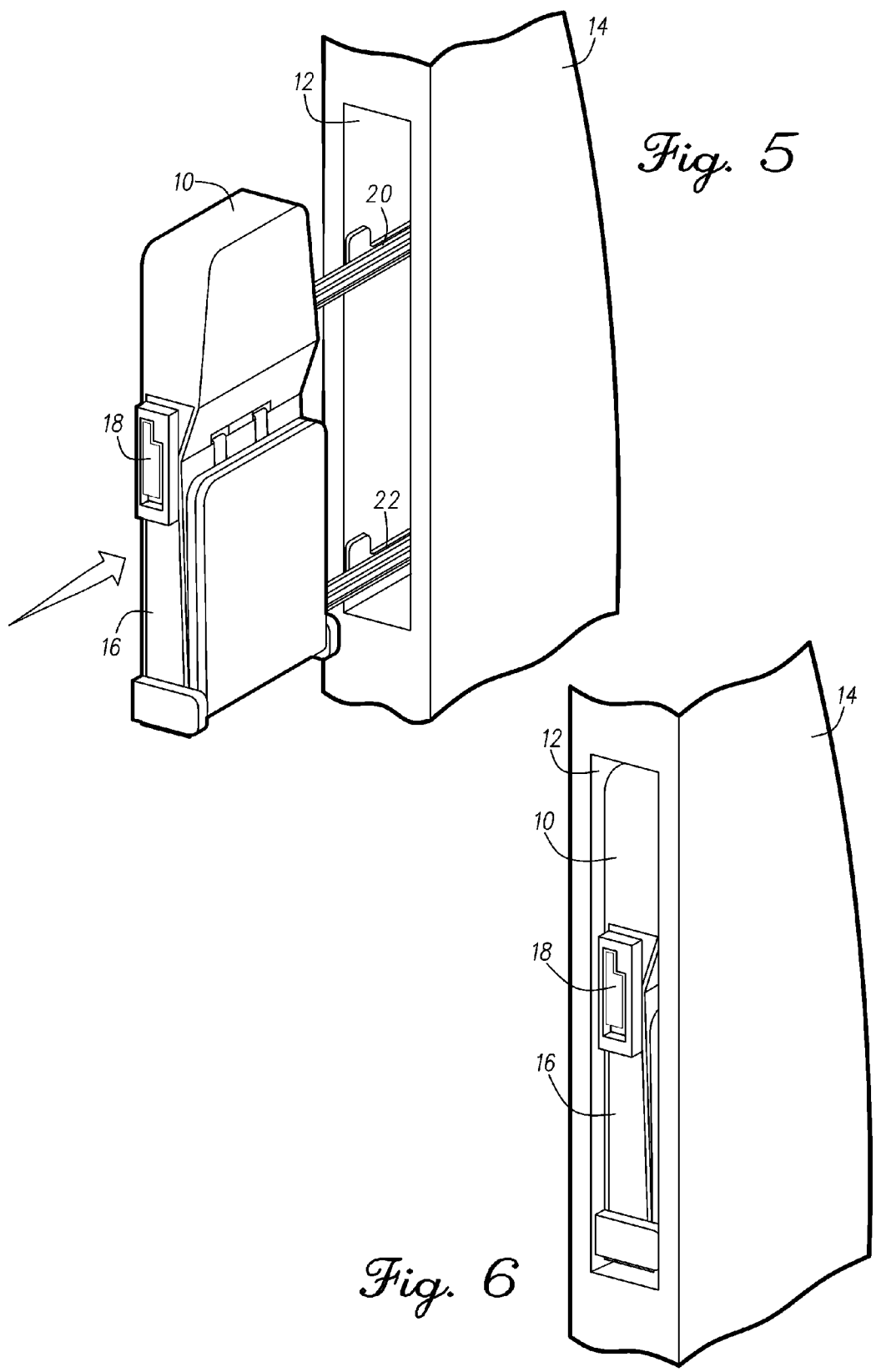

US 8,770,659 B2

SELF-STOWING JUMPSEAT FOR AIRCRAFT

CLAIM OF PRIORITY

This invention claims priority of U.S. Provisional Patent Application 61/439,501 filed on Feb. 4, 2011.

BACKGROUND OF THE INVENTION

This invention relates generally to aircraft interiors, and in particular to aircraft seating.

Jumpseats are commonly provided in commercial aircraft to provide seating for flight attendants during takeoff, landing, in turbulence, and other times when the safety of the flight attendants requires them to be seated. In order to maximize the seat space available for passengers, it is desirable to have flight attendant seats that are compact and do not impinge on passenger space. Consequently, flight attendant jumpseats are commonly attached to the fore and aft bulkheads, which separate the lavatories from the front aisle, rear aisle, galley, etc. As commercial aircraft increase in size, the space available at the fore and aft bulkheads necessary to accommodate jumpseats for a full complement of flight attendants is inadequate. Design constraints for commercial aircraft require maximum room for passenger seating. Consequently, it is desirable to minimize the space dedicated to flight attendant jumpseats.

Additionally, current flight attendant jumpseats must be manually stowed by the flight attendant. This manual stowing of the jumpseat is time-consuming and detracts from the tasks the flight attendants are required to perform. Moreover, if the flight attendant fails to stow the seat, or stows the seat incorrectly, there is potential for the seat to obstruct aisle ways, which could prevent occupant egress in an emergency evacuation or cause injury to passengers walking past the seat.

SUMMARY OF THE INVENTION

The present invention comprises a self-stowing jumpseat. According to an illustrative embodiment of the invention, the self-stowing jumpseat comprises a seat frame that is deployed by pulling the seat frame out of a pocket formed in the edge of a bulkhead in a manner similar to the action required to close a pocket door. Once the seat frame has been deployed and locked in position, the seat pan is folded down to enable a user to be seated. The seat pan is spring-loaded to fold up, so that when the user vacates the seat, the seat pan automatically folds up into the closed configuration. As it does so, an interlock lever attached to the seat pan trips the seat frame locks from their locked to their unlocked positions. The seat frame has a retraction mechanism that urges the seat into the pocket. Accordingly, as soon as the seat pan interlock lever releases the seat frame locks, the retraction mechanism causes the now-folded seat frame to move automatically into the stowed position within the bulkhead.

BRIEF DESCRIPTION OF THE DRAWING

The present invention will be better understood from a reading of the following detailed description, taken in conjunction with the accompanying drawing figures in which like references designate like elements and, in which:

FIG. 1 is a perspective view of a jumpseat incorporating features of the present invention in the concealed position within the bulkhead pocket;

FIG. 2 is a perspective view of the jumpseat of FIG. 1 moving from the concealed position to a deployed position;

FIG. 3 is a perspective view of the jump seat of FIG. 1 in the deployed and locked position;

FIG. 4 is a perspective view of the jump seat of FIG. 1 in the deployed and locked position with a seat pan folded down into the open position;

FIG. 5 is a perspective view of the jumpseat of FIG. 1 with the seat pan folded up into the closed position and the jumpseat moving from the deployed position toward the concealed position;

FIG. 6 is a perspective view of the jumpseat of FIG. 1 returned to the concealed position;

DETAILED DESCRIPTION

Figure 7:
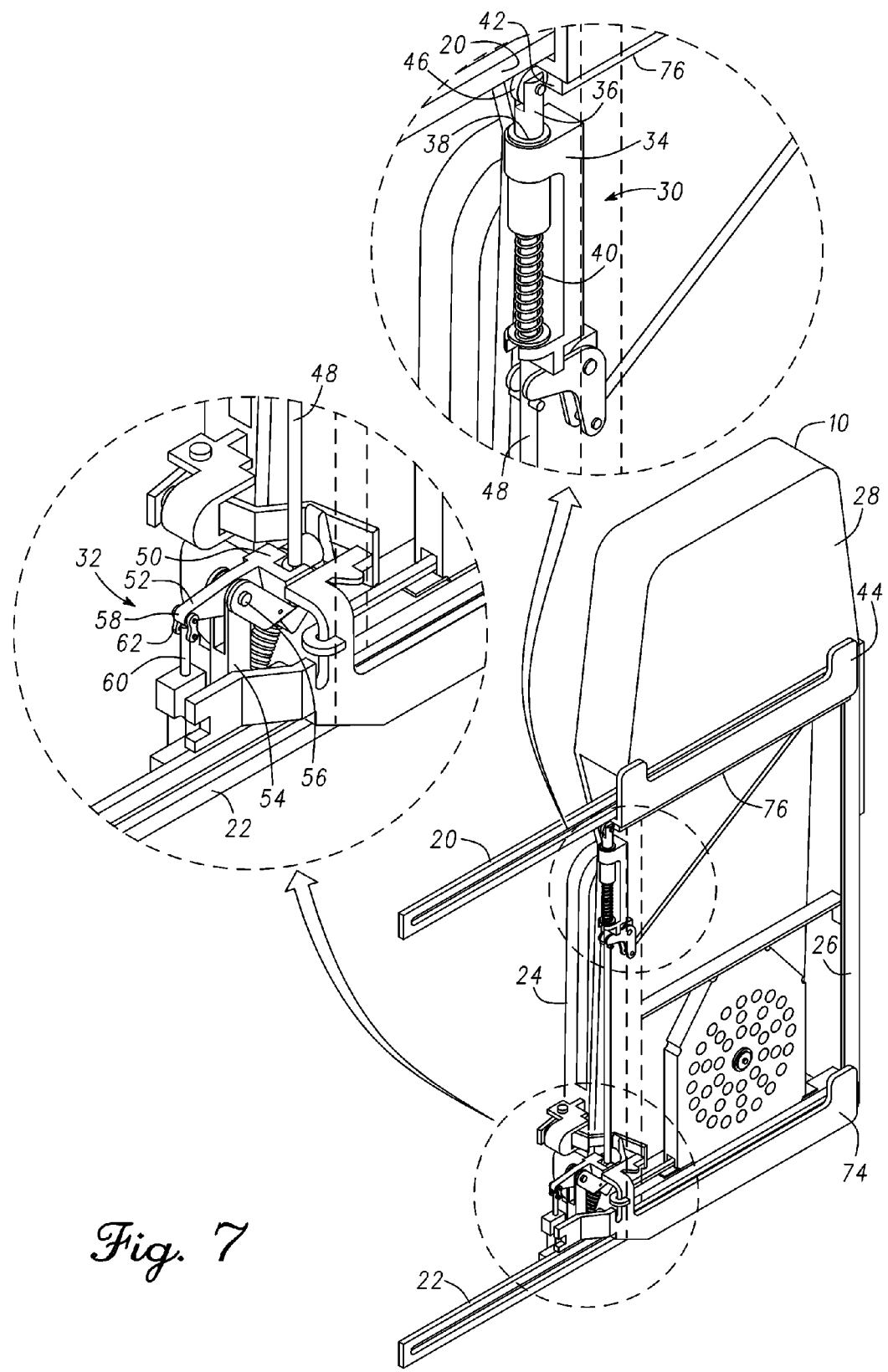
FIG. 7 is a rear perspective view of the jumpseat of FIG. 1 showing details of the lock mechanism in the concealed, locked position.

The drawing figures are intended to illustrate the general manner of construction and are not necessarily to scale. In the detailed description and in the drawing figures, specific illustrative examples are shown and herein described in detail. It should be understood, however, that the drawing figures and detailed description are not intended to limit the invention to the particular form disclosed, but are merely illustrative and intended to teach one of ordinary skill how to make and/or use the invention claimed herein and for setting forth the best mode for carrying out the invention.

With reference to FIGS. 1-6, a jumpseat 10 incorporating features of the present invention is stowed initially within a hollow pocket 12 formed inside bulkhead 14. Bulkhead 14 may be a lavatory bulkhead or galley bulkhead as is commonly employed to support conventional flight attendant jumpseats, or may be a much thinner bulkhead such as commonly employed to separate the first class and coach cabins. As shown in FIG. 1, in the concealed, stowed position, jumpseat 10 is concealed entirely within pocket 12 with the exception of exposed edge 16, which supports latch handle 18.

With particular reference to FIG. 2, in order to use jumpseat 10, the crewmember lifts latch handle 18, which releases the seat frame locks (described more fully hereinafter). This enables jumpseat 10 to be withdrawn from hollow pocket 12. The jumpseat is then withdrawn by the crewmember to the position shown in FIG. 3. As the jumpseat 10 is drawn outward, it translates along a pair of linear support rails comprising upper support rail 20 and lower support rail 22. Upper support rail 20 and lower support rail 22 each comprise a solid bar of 2024-T351 aluminum approximately 1.78×1.19 inches in cross section each supported by rollers (not shown) spaced approximately 12 inches apart within the bulkhead 14, thus enabling the cantilevered jumpseat 10 to withstand approximately 1,900 lbs (9G's for a $50^{th}$ percentile male) of forward acceleration, 6G's of downward acceleration, and 4G's of lateral acceleration.

When the jumpseat 10 reaches the position shown in FIG. 3, the crewmember releases latch handle 18, which causes the seat frame locks to engage so that the jumpseat 10 remains in the deployed, but still folded configuration. If, at this point, the crewmember wishes for the jumpseat 10 to be stowed (e.g. the crewmember must attend to a passenger), the crewmember can simply lift latch handle 18, which will disengage the seat frame locks. Jumpseat 10 has a retraction mechanism that urges seat into hollow pocket 12. Accordingly, as soon as the seat frame locks are released, the retraction mechanism causes jumpseat 10 to move automatically into the stowed, concealed position within bulkhead 14 as shown in FIG. 6.

In order to use jumpseat 10, once the jumpseat is in the deployed, folded configuration shown in shown in FIG. 3, the crewmember simply folds seat pan 24 down into the position shown in FIG. 4 with the upper surface 25 of seat pan 24 and the front surface 17 of seat back 15 exposed to accommodate the crewmember. Seat pan 24 is spring-loaded into the folded configuration. Accordingly, when the crewmember vacates the seat, seat pan 24 automatically folds back into the folded configuration as shown in FIG. 5 with the upper surface 25 of seat pan 24 facing the front surface 17 of seat back 15. As seat pan 24 moves toward the closed configuration, a seat pan-mounted interlock lever (described more fully hereinafter) trips the seat frame locks from their locked to their unlocked positions. This allows the retraction mechanism to move jumpseat 10 into the concealed position shown in FIG. 6.

The operation of the seat locks, interlock lever and other mechanisms necessary for the operation of jumpseat 10 are most easily understood with reference to FIGS. 7-14, which show a rear view of jumpseat 10 with bulkhead 14 removed for clarity. FIG. 7 shows jumpseat 10 in the concealed position within the hollow pocket formed within bulkhead 14. Jumpseat 10 comprises a seat frame 26 which supports the back portion 28 and the seat pan 24. Seat frame 26 also supports upper seat frame lock 30 and lower seat frame lock 32.

Upper seat frame lock 30 comprises a housing 34 mounted to seat frame 26 which supports upper lock plunger 36. Upper lock plunger 36 slides in a vertical direction through an aperture 38 formed in housing 34. A spring or other resilient member 40 urges upper lock plunger 36 upward toward upper support rail 20. In the concealed position as shown in FIG. 7, upper lock plunger 36 engages a step 42 formed in upper support bracket 44, which causes upper lock plunger 36 to retain jumpseat 10 in the concealed position. Upper lock plunger 36 terminates at its upper end with a roller 46 or other low-friction surface that enables upper lock plunger 36 to slide against the lower surface 76 of upper support bracket 44. Upper lock plunger 36 also includes a lower extension 48 which extends downward to engage the input end 50 of rocker arm 52.

Lower seat frame lock 32 comprises a second housing 54 mounted to seat frame 26. Housing 54 supports a pin 56 about which rocker arm 52 pivots. Output end 58 of rocker arm 52 is attached to a lower lock plunger 60 which engages a hole, notch or step formed in lower support bracket 74 in a manner similar to the manner in which upper lock plunger 36 engages notch 42 to assist in retaining jumpseat 10 in the concealed position. A link 62 may be used to couple the arcuate motion of output end 58 to the linear motion of lower lock plunger 60 to avoid causing the mechanism to bind.

Figure 8:
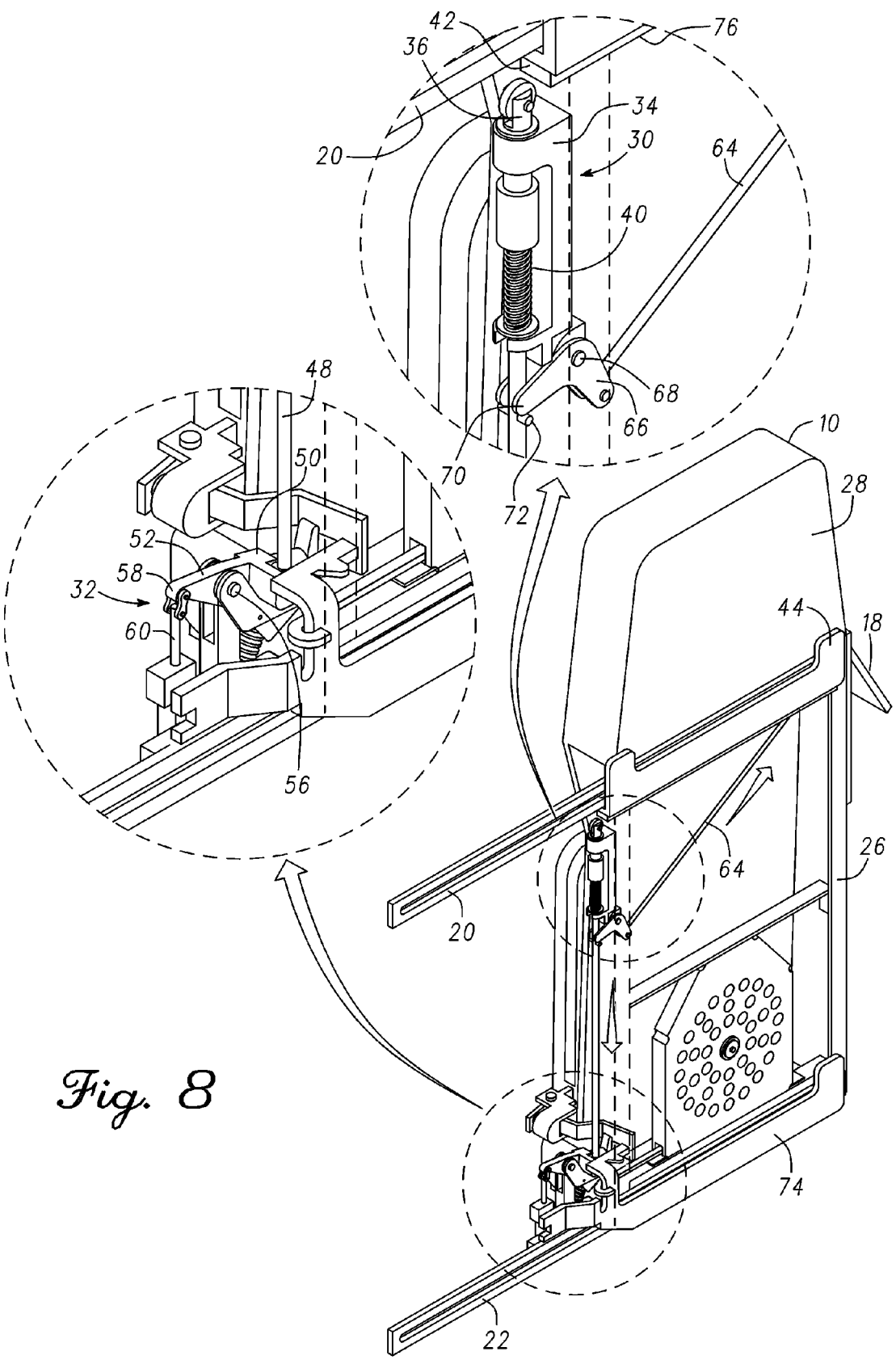
FIG. 8 is a rear perspective view of the illustrative jumpseat with the seat frame locks released.

With reference in particular to FIG. 8, as latch handle 18 is pulled upward (and outward), it causes operating rod 64 to rotate bell crank 66 counterclockwise about its pivot 68 (as viewed in FIG. 8). This causes distal end 70 of bell crank 66 to press downward on pin 72, which in turn causes upper lock plunger 36 to move downward. This action disengages upper lock plunger 36 from step 42 thereby releasing upper seat frame lock 30. Simultaneously the downward motion of lower extension 48 causes input end 50 of rocker arm 52 to rotate downward. This causes output end 58 of rocker arm 52 to draw lower lock plunger 60 upward against a lower lock spring (not shown), which spring-loads lower lock plunger 60 downward into its engaged position. The movement of rocker arm 52 disengages lock plunger 60 from the notch in lower support bracket 74 thereby releasing lower seat frame lock 32. The simultaneous release of upper seat frame lock 30 and lower seat frame lock 32 releases seat frame 26 so that the crewmember can begin to withdraw jumpseat 10 from hollow pocket 12.

Figure 9:
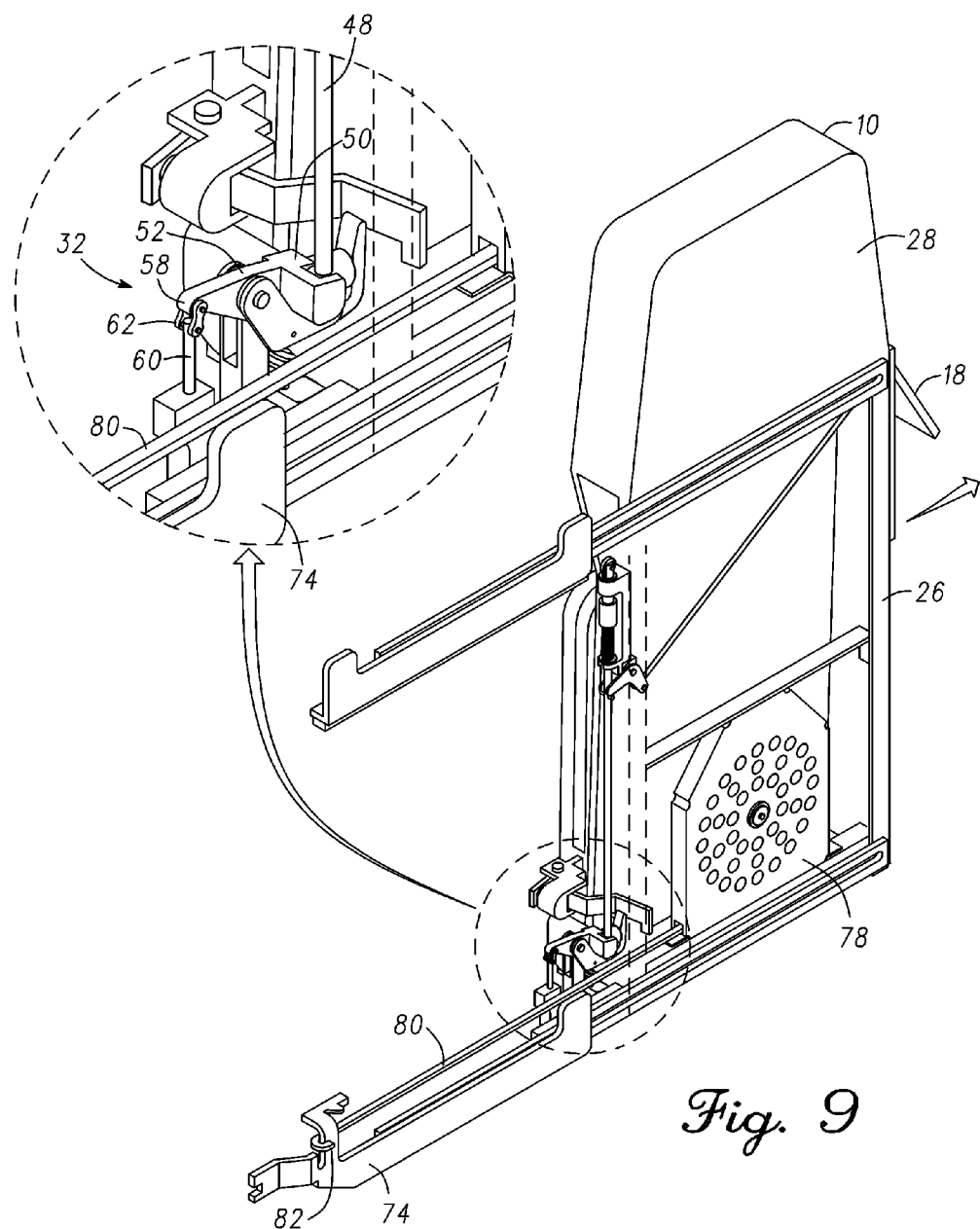
FIG. 9 is a rear perspective view of the illustrative jumpseat in the deployed position.

With reference in particular to FIG. 9, as the crewmember withdraws jumpseat 10 from hollow pocket 12 to the fully deployed but folded configuration as shown in FIGS. 3 and 9, the crewmember's efforts are resisted by a retraction mechanism consisting of a spring motor 78 which is operatively attached to lower support bracket 74 by means of a tension member such as a cable 80, which is attached to an upright flange 82 extending from lower support bracket 74.

Figure 10:
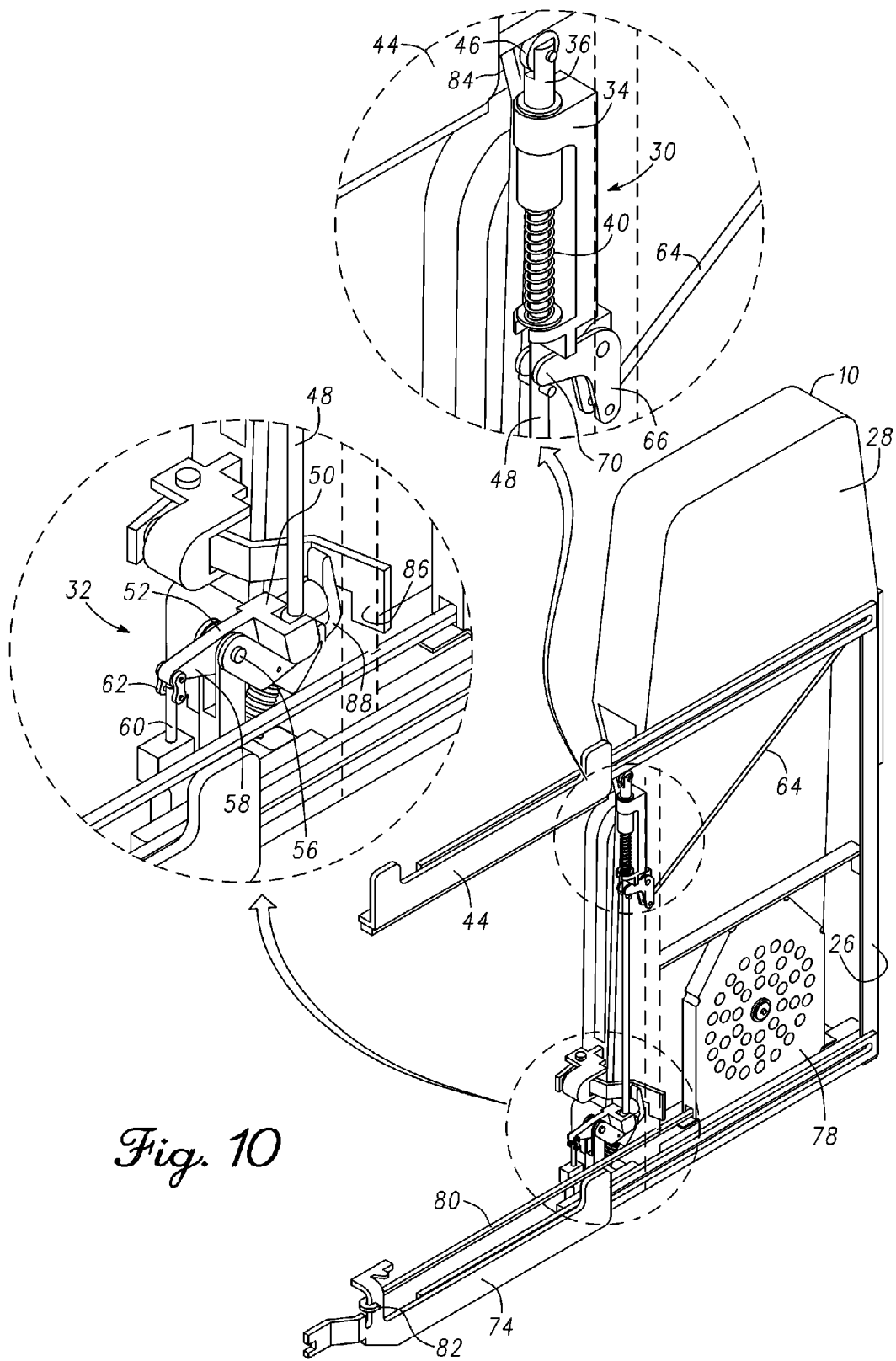
FIG. 10 is a rear perspective view of the illustrative jumpseat in the deployed position with the locks engaged.

With reference in particular to FIG. 10, once jumpseat 10 has been withdrawn by the crewmember to the fully extended position, latch handle 18 is released. This allows spring 40 to return upper lock plunger 36 to its upwardly extended position as shown in FIG. 10. Simultaneously, lower extension 48 moves upward, which allows rocker arm 52 to rotate counterclockwise about pivot 56 thereby allowing lower lock spring to return lower lock plunger 62 to its extended position. Spring 40 and lower lock spring are relatively fast-acting as compared with spring motor 78. Accordingly, upper lock plunger 36 and lower lock plunger 60 are returned to their extended positions before spring motor 78 is able to retract jumpseat 10 into hollow pocket 12. Consequently, as spring motor 78 attempts to retract the seat and into hollow pocket 12, upper lock plunger 36 engages an outer surface 84 of upper support bracket 44 and lower lock plunger 60 engages a similar feature in lower support bracket 74 to retain jumpseat 10 in the deployed position as shown in FIG. 3 and FIG. 10.

Figure 11:
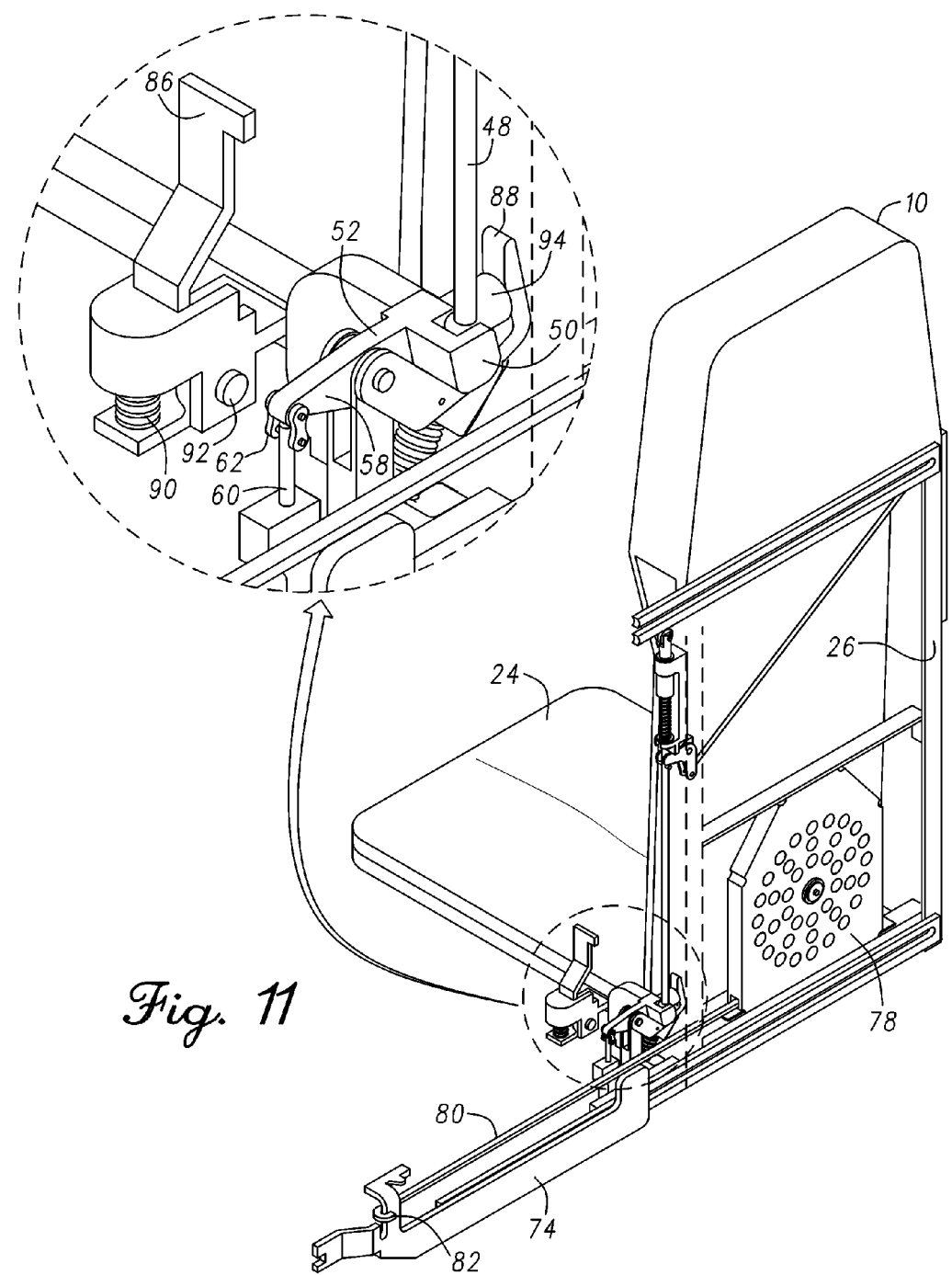
FIG. 11 is a rear perspective view of the illustrative jumpseat with the seat pan folded down into the open position.

With particular reference to FIG. 11, with jumpseat 10 now in the deployed and locked position, in order to use jumpseat 10, the crewmember simply folds seat pan 24 downward to the position shown in FIG. 11. As seat pan 24 is folded downward, interlock lever 86 slides off the end of the keeper 88, which allows interlock lever spring 90 to rotate interlock lever 86 counterclockwise about pivot 92. This causes interlock lever 86 to become aligned with roller 94 which is attached to input end 50 of rocker arm 52. Once the crewmember vacates the seat, a torsional spring (not shown) automatically returns seat pan 24 to the folded condition.

Figure 12:
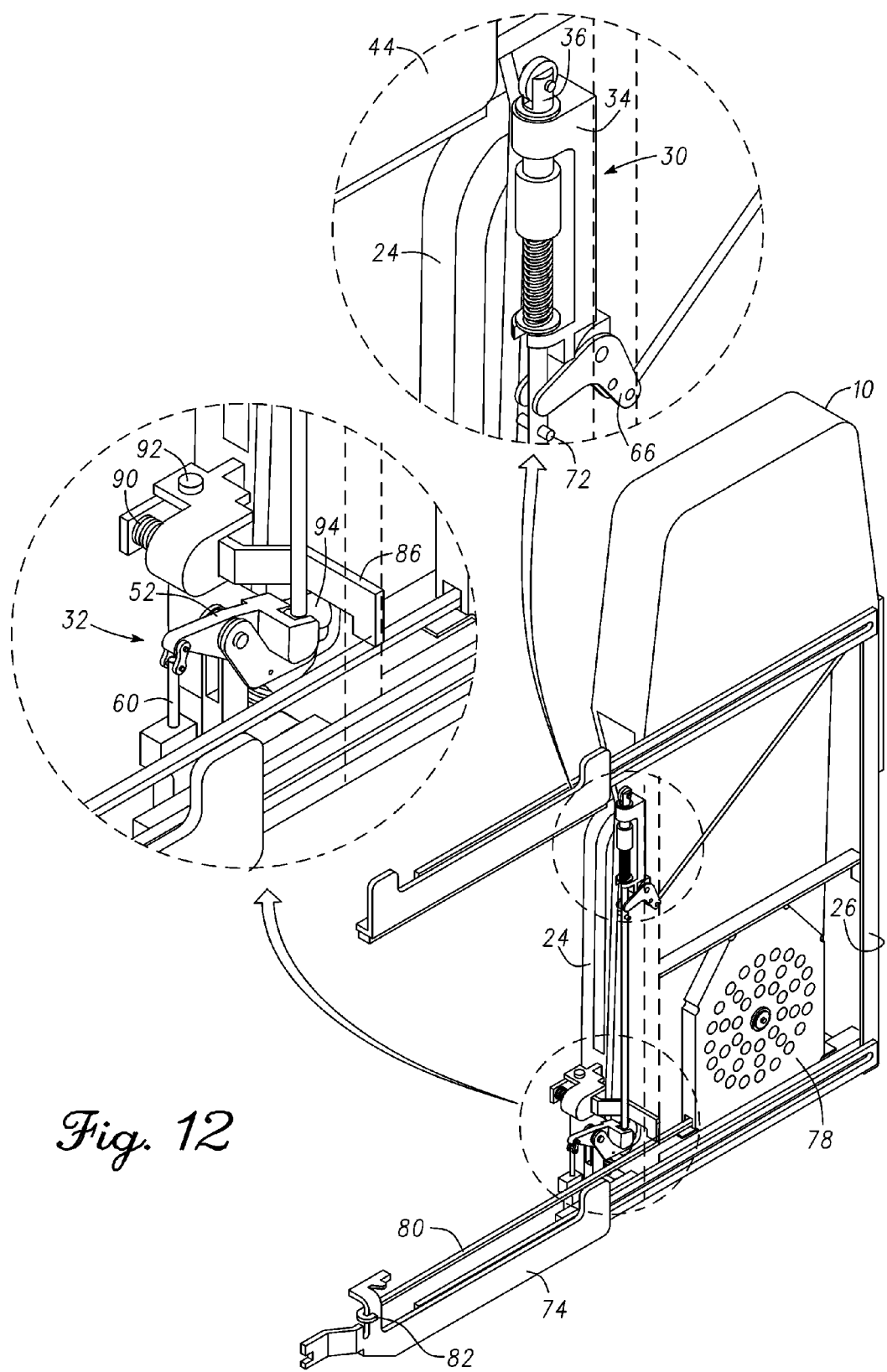
FIG. 12 is a rear perspective view of illustrative jumpseat showing the interlock lever tripping the seat frame locks from their locked positions to their unlocked positions.

With particular referenced to FIG. 12, with interlock lever 86 now aligned with roller 94, as seat pan 24 is returned to its folded condition, interlock lever 86 presses downward on roller 94. This causes rocker arm 52 to rotate clockwise. As it does so, rocker arm 52 raises lower lock plunger 60 and lowers upper lock plunger 36, thereby releasing upper seat frame lock 30 and lower seat frame lock 32. Spring motor 78 is then able to retract jumpseat 10 into hollow pocket 12.

Figure 13:
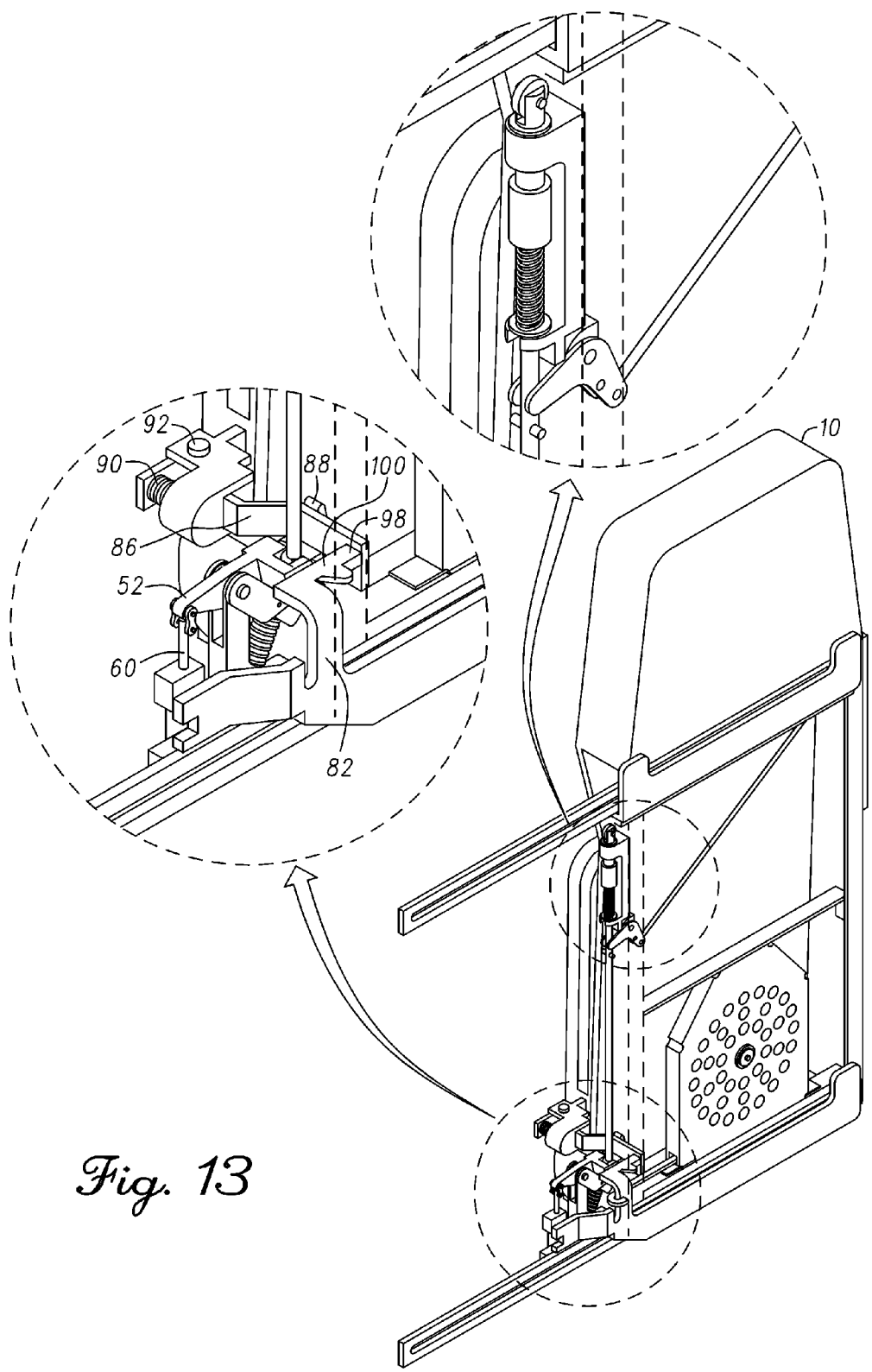
FIG. 13 is a rear perspective view of the illustrative jumpseat returning to the concealed position.
Figure 14:
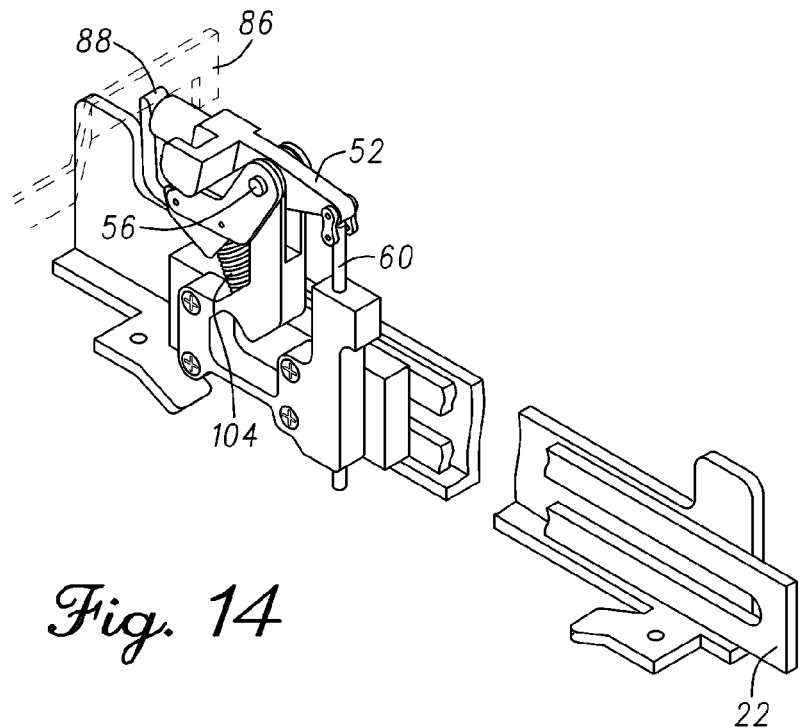
FIG. 14 is a detailed perspective view of the lower lock mechanism illustrating the resetting of the interlock lever.
Figure 15:
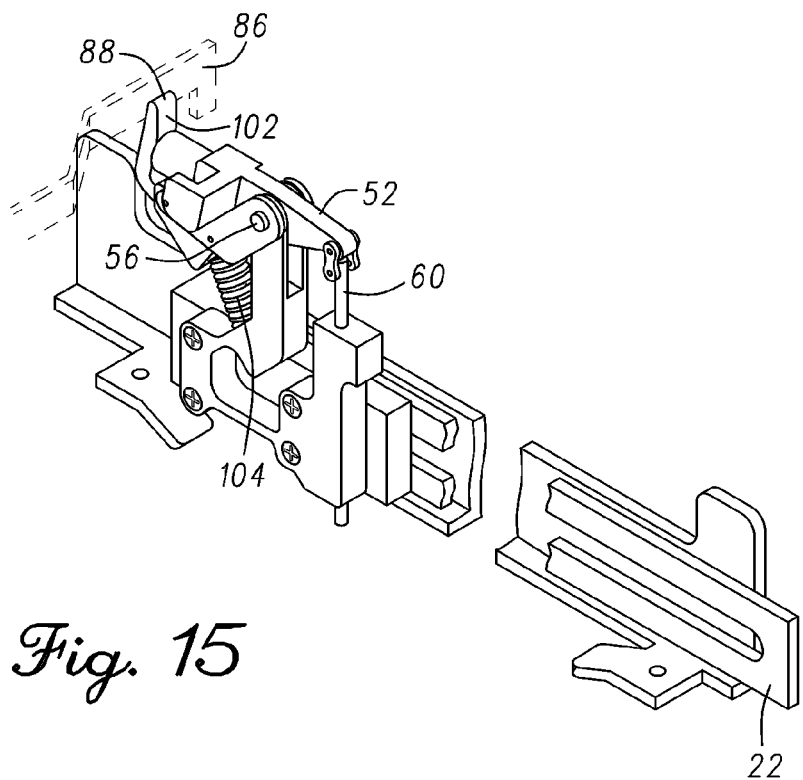
FIG. 15 is a detailed perspective view of the lower lock mechanism with the interlock lever reset.

With particular reference to FIGS. 13-15, as jumpseat 10 returns to its fully-retracted position, interlock lever 86 strikes the outer tip 98 of reset flange 100. This causes interlock lever 86 to compress interlock lever spring 90 to the compressed position as shown in FIG. 7. Simultaneously, interlock lever 86 presses against the inclined surface 102 of keeper 88. Because keeper 88 pivots independently about pivot 56 the action of interlock lever 86 pressing against inclined surface 102 causes keeper 88 to swing downward out of the way, thereby permitting interlock lever 86 to return to the fully-reset position as shown in FIG. 7. Keeper 88 then snaps back into position under the influence of keeper spring 104.

Although certain illustrative embodiments and methods have been disclosed herein, it will be apparent from the foregoing disclosure to those skilled in the art that variations and modifications of such embodiments and methods may be made without departing from the invention. Accordingly, it is intended that the invention should be limited only to the extent required by the appended claims and the rules and principles of applicable law. Additionally, as used herein, unless otherwise specifically defined, the terms "substantially" or "generally" when used with mathematical concepts or measurements mean within ±10 degrees of angle or within 10 percent of the measurement, whichever is greater.

What is claimed is:

1. A jumpseat for use in an aircraft having a bulkhead, the bulkhead having a wall surface and an edge surface, the edge surface oriented substantially normal to the wall surface, the bulkhead further comprising a hollow pocket concealed behind the wall surface, the hollow pocket having an opening formed in the edge surface, the opening having a width dimension, the jumpseat comprising:
    a seat frame comprising a seat back having a back surface and a front surface, the seat back defining a seat back plane, the seat frame further comprising a seat pan having a top surface and a bottom surface, the seat pan being joined to the seat back by a hinged connection having an axis of rotation, the hinged connection enabling the seat pan to be folded upward from an unfolded configuration in which the seat pan is folded down enabling a user to sit on the seat pan to a folded configuration in which the top surface of the seat pan is adjacent the front surface of the seat back
    said seat frame being movable in the folded configuration in a translational direction substantially parallel to the front surface of the seat back from a concealed position in which the seat frame is contained within the hollow pocket, to an exposed position in which the seat frame is outside of the pocket and adjacent to the edge surface.

2. The jumpseat of claim 1, wherein:
    said seat frame is further moveable from the exposed position in the folded configuration, to an exposed position in the unfolded configuration.

3. The jumpseat of claim 1, further comprising:
    a resilient member operatively connected to the seat pan for urging the seat pan from the unfolded configuration to the folded configuration.

4. The jumpseat of claim 3, wherein:
    the resilient member comprises a torsion spring.

5. The jumpseat of claim 1 wherein:
    the hollow pocket has a depth dimension the depth dimension of the hollow pocket being greater than the width dimension of the opening.

6. The jumpseat of claim 1, further comprising:
    a resilient member operatively connected between the seat frame and the bulkhead for urging the seat frame from the exposed position to the concealed position.

7. The jumpseat of claim 6, further comprising:
    a latch engaging an outer stop for retaining the seat frame in the exposed position; and
    an interlock, the interlock operating to release the latch as the seat pan moves from the unfolded configuration to the folded configuration.

8. The jumpseat of claim 7, wherein:
    the interlock comprises a interlock lever attached to the seat pan for rotation about the hinged connection.

9. The jumpseat of claim 8, further comprising:
    a reset tab operatively attached to the bulkhead, and;
    a spring-loaded pivot providing a pivoting attachment between the interlock lever and the seat pan, the pivoting attachment having an axis of rotation normal to the axis of rotation of the hinged connection of the seat pan, the reset tab engaging the interlock lever as the seat frame moves into the concealed position to move the interlock lever against the spring-loaded pivot to disengage the interlock lever from the latch.

10. The jumpseat of claim 7, further comprising:
    an inner stop capable of being engaged by the latch for retaining the seat frame in the concealed position.

11. A jumpseat for use in an aircraft having a bulkhead comprising a wall surface extending into the passenger compartment, the jumpseat comprising:
    a seat frame comprising a seat back having a back surface and a front surface, the seat back defining a seat back plane, the seat frame further comprising a seat pan having a top surface and a bottom surface, the seat pan being joined to the seat back by a hinged connection, the hinged connection enabling the seat pan to be folded upward from an unfolded configuration in which the seat pan is folded down enabling a user to sit on the seat pan to a folded configuration in which the top surface of the seat pan is adjacent to the front surface of the seat back; and
    a support rail mounted to the bulkhead, the support rail having a longitudinal axis parallel to the wall surface of the bulkhead;
    said seat frame being movable in a translational direction parallel to the longitudinal axis of the support rail and in a direction substantially parallel to the front surface of the seat back from a stowed position to a deployed position in which the seat frame is cantilevered beyond the wall surface into the passenger compartment.

12. The jumpseat of claim 11, further comprising:
    a resilient member operatively connected to the seat pan for urging the seat pan from the unfolded configuration to the folded configuration.

13. The jumpseat of claim 11, further comprising:
    a resilient member disposed between the seat frame and the bulkhead for urging the seat frame from the deployed position to the stowed position.

14. The jumpseat of claim 13, further comprising:
    a latch engaging an outer stop for retaining the seat frame in the exposed position; and
    an interlock, the interlock operating to release the latch as the seat pan moves from the unfolded configuration to the folded configuration.

15. The jumpseat of claim 14, wherein:
    the interlock comprises a interlock lever attached to the seat pan for rotation about the hinged connection.

16. The jumpseat of claim 15, wherein the hinged connection has an axis of rotation and the jumpseat further comprises:
    a reset tab operatively attached to the bulkhead, and;

a spring-loaded pivot providing a pivoting attachment between the interlock lever and the seat pan, the pivoting attachment having an axis of rotation normal to the axis of rotation of the hinged connection of the seat pan, the reset tab engaging the interlock lever as the seat frame moves to the concealed position to move the interlock lever against the spring-loaded pivot to disengage the interlock from the latch.

17. The jumpseat of claim 14, further comprising:
an inner stop capable of being engaged by the latch for retaining the seat frame in the concealed position.

18. The jumpseat of claim 11, wherein:
the jumpseat is capable of withstanding at least 9G's of forward acceleration while supporting a $50^{th}$ percentile male occupant.

* * * * *